Oct. 1, 1935.  R. J. DE WEES  2,016,080

LICENSE PLATE HOLDER

Filed April 2, 1934

Inventor
Russell J. DeWees

By Jack Ashley
Attorney

Patented Oct. 1, 1935

2,016,080

UNITED STATES PATENT OFFICE 2,016,080

LICENSE PLATE HOLDER

Russell J. De Wees, Dallas, Tex.

Application April 2, 1934, Serial No. 718,598

9 Claims. (Cl. 40—125)

This invention relates to new and useful improvements in license plate holders.

One object of the invention is to provide an improved combined license plate holder and display for securing a license plate to a motor vehicle.

A particular object of the invention is to provide a license plate holder having means for uniting the holder and the license plate and engaging a support, whereby the holder and plate may be adjustably connected and also adjustably mounted on a motor vehicle.

A further object of the invention is to provide a holder for a license plate having a display panel and a support for engaging the upper edge of the plate and means for connecting the plate and holder and also for mounting them on a motor vehicle supporting member.

Still another object of the invention is to provide an improved holder for a license plate including a display panel and upright supports for mounting the holder on an automobile bracket and serving to support the license plate and panel and reinforce the same.

A construction designed to carry out the invention will be hereinafter described, together with other features of the invention.

The invention will be more readily understood from a reading of the following specification and by reference to the accompanying drawing, in which an example of the invention is shown, and wherein.

Figure 1:
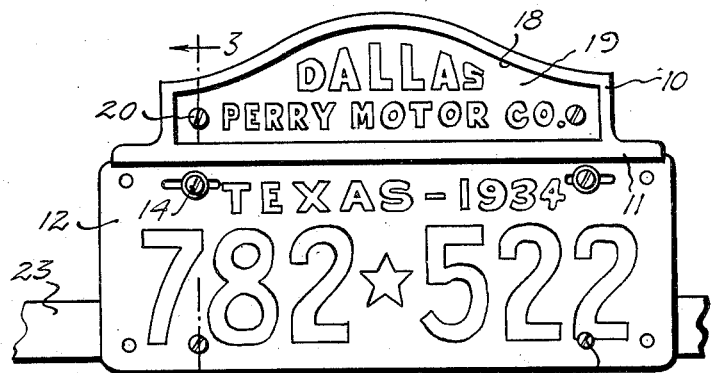
Figure 1 is a front elevation of a holder constructed in accordance with the invention, and showing a license plate secured therein.
Figure 2:
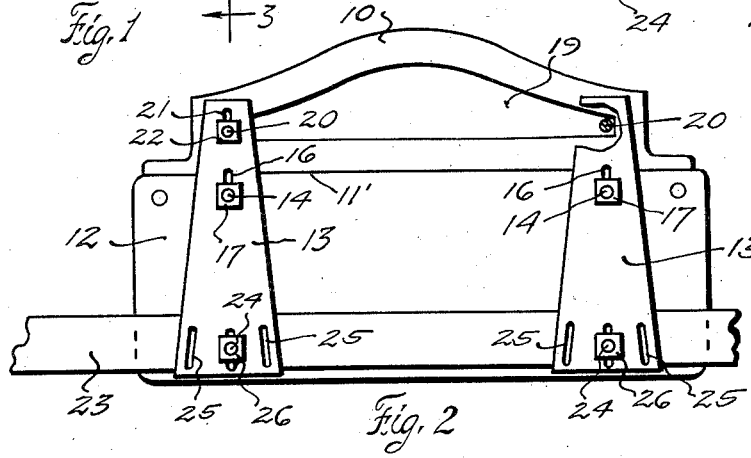
Figure 2 is a rear view of the same.

In the drawing, the numeral 10 designates an elongated frame which is preferably made of some lightweight metal, such as sheet steel, aluminum or the like, although it is not essential. The frame may be of an artistic design to add to its appearance and may be approximately the length of the ordinary license plate for motor vehicles. The frame is provided along its lower front edge with a longitudinal flange 11 depending therefrom, whereby a longitudinal recess 11' is provided along the lower rear edge of the frame. The upper edge of the license plate 12 is positioned to engage in the recess 11', whereby the upper edge of said plate is reinforced and prevented from being bent out of shape.

A pair of flared brace bars or upright supports 13 lie along the rear side of the license plate and panel, and bolts 14 which pass through openings 15 near the upper edge of the plate and through a vertical slot 16 in each bar 13, receive nuts 17 to securely fasten the plate to said bars. By providing the slot 16, a certain amount of adjustment of the bars 13 with relation to the license plate 12 is had.

Figure 3:
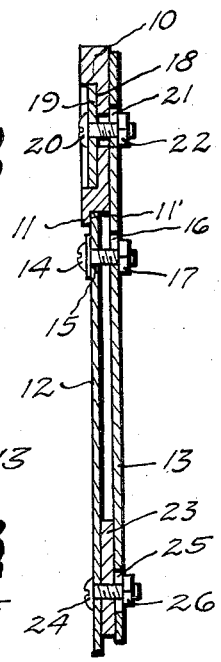
Figure 3 is a vertical sectional view taken on the line 3—3 of Figure 1.

The frame is formed with an elongated depression or recess 18 which receives a suitable display panel 19. The panel may have any desired indicia painted, or in any other way, suitably displayed thereon. Bolts 20 pass through the panel and the back of the recess 18 and through a vertical slot 21 in the upper end of each brace bar 13, and receive nuts 22 on their outer ends (Figure 3). It is obvious that the bolts 20 and nuts 22 not only hold the panel 19 in position within the recess 18, but also serve to fasten the frame 10 rigidly to the brace bars 13. The slot 21 in the upper ends of the bars allows for adjustment of said bars with relation to the frame 10. If it is desired to change the indicia displayed in the frame 10 it is only necessary to substitute another panel for the panel 19. The change is readily accomplished by removing the bolts 20.

For securing the holder and license plate, which is fastened thereto by the bolts 14 and nuts 17, to a motor vehicle, the usual supporting bracket 23 of said vehicle is inserted between the license plate 12 and the brace bars 13 at the lower ends thereof. Bolts 24 pass through the license plate, through said bracket and through slots 25 in the lower end of the brace bars. Suitable nuts 26 are screwed onto the ends of the bolts 24 and serve to fasten the plate and bars to the bracket 23. I have shown a trio of slots 25 in the lower widened end of each brace bar. These slots are provided to take care of the varying positions of the openings in the lower ends of different license plates, and it is pointed out that regardless of the license plate fastened in the holder it is possible to register the openings in said plate with one of the slots.

When the license plate is secured to the holder and is in position on the bracket 23, the frame 11 engages over the upper edge of the license plate, thereby reinforcing and bracing this edge, and preventing bending or crimping thereof. The vertical slots 16, 21, and 25 in the bars 13 allow for a vertical adjustment so that license plates, which vary in size in different States, may be supported by said holder. It is obvious that the bars not only serve to support the license plate and frame 10, but due to the increased width of their lower ends, will brace the license plate, adding rigidity thereto. Although I have shown the display panel 19 secured by the bolts 20, it is clearly within the invention to secure this panel within the recess 18 with rivets or other means, or to cast the letters on the frame itself, thereby eliminating the panel entirely and providing a permanent sign.

Figure 4:
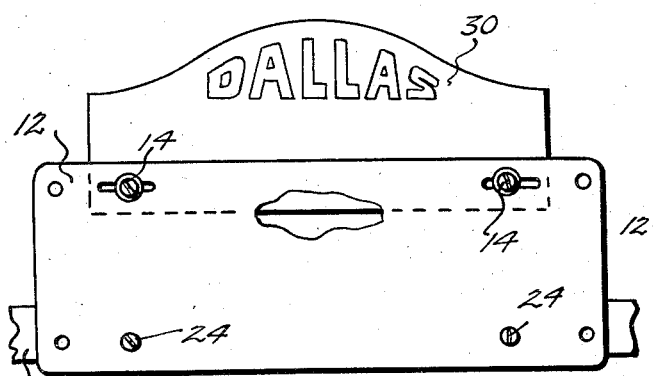
Figure 4 is a front elevation of another form of the invention.
Figure 5:
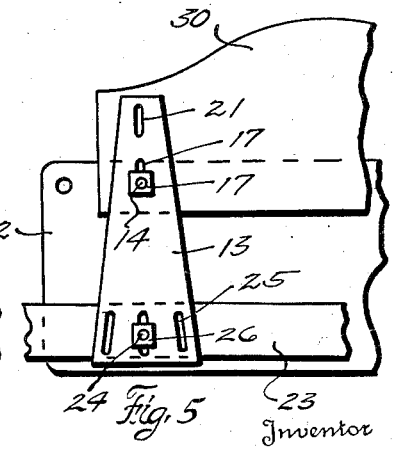
Figure 5 is a rear view of the same.

In Figures 4 and 5 I have shown a modified form of the invention. In this form the frame 10 is eliminated and a thin metal display panel 30 is substituted therefor. The plate may be any desired shape and extends approximately the length of an ordinary license plate. The lower edge of said plate 30 engages the rear upper portion of the license plate 12 and is secured in position between said plate and the brace bars 13 by the bolts 14, which pass through said plate, panel 30 and the bars. Any suitable indicia may be painted, or in any other way, displayed on the panel 30. It is pointed out that the lower edge of the panel will brace the upper edge of the license plate and together with the brace bars 13 will provide a rigid support for said license plate. In the form shown in Figures 4 and 5, which is cheaper in construction than the other form described, the bolts 20 are eliminated, the only connecting means between the panel 30 and the brace bars 13 being the bolts 14.

What I claim and desire to secure by Letters Patent, is:

1. A holder for a motor vehicle license plate comprising, an elongated member engaging the upper edge of a license plate and having indicia thereon, upright supports secured to said member at their upper ends, means for securing said supports to a license plate below said member, and means for securing said supports to a motor vehicle mounting.

2. A holder for a motor vehicle license plate comprising, an elongated member for receiving the upper edge of a license plate and having indicia thereon, upright supports secured to said member at their upper ends, means for securing said supports to a license plate below said member, and means at the lower ends of said supports for securing the same to a motor vehicle mounting.

3. A holder for a motor vehicle license plate comprising, an elongated member for receiving the upper edge of a license plate and having indicia thereon, upright supports secured to said member at their upper ends, means for securing said supports to a license plate below said member, and means at the lower ends of said supports for securing the same to a motor vehicle mounting, said last named means also being utilized to fasten the lower edge of a license plate to said support.

4. A holder for a motor vehicle license plate comprising, an elongated frame member for receiving the upper edge of a license plate, a display panel having indicia thereon arranged to be removably mounted in the frame member, upright supports secured to the frame member at their upper ends, means for securing said supports to a license plate below said member, and means at the lower ends of said supports for securing the same to a motor vehicle.

5. A holder for a motor vehicle license plate comprising, an elongated frame having a longitudinal depending flange for receiving the upper edge of the front face a license plate to reinforce the same, a display panel having indicia thereon arranged to be removably mounted in the frame, vertical bars secured to the frame and license plate near their upper ends, and means for securing said bars to a license plate below said member.

6. A holder for a motor vehicle license plate comprising, an elongated frame having a longitudinal depending flange for receiving the upper edge of a license plate to reinforce the same, a display panel having indicia thereon arranged to be removably mounted in the frame, vertical bars secured to the frame at their upper ends, means for securing said bars to a license plate below said member, and means at the lower ends of said bars for securing the same to a motor vehicle mounting.

7. A holder for a motor vehicle license plate comprising, an elongated frame having a longitudinal depending flange for receiving the upper edge of a license plate to reinforce the same, a display panel having indicia thereon arranged to be removably mounted in the frame, vertical bars secured to the frame at their upper ends, means for securing said bars to a license plate below said member, and means at the lower ends of said bars for securing the same to a motor vehicle mounting, said last named means also being utilized to fasten the lower edge of a license plate to said support.

8. A holder for a motor vehicle license plate comprising, an elongated frame member for receiving the upper edge of a license plate, a display panel, upright supports, means for securing the upper ends of the supports to the frame member, said means being also utilized to hold the panel in the frame member, and means for securing said supports to a license plate below said member.

9. A holder for a motor vehicle license plate comprising, an elongated panel having indicia thereon for engaging the rear upper portion of a license plate to brace the same, upright supports, and means for securing said supports to the lower edge of the panel, said means also being utilized to secure the supports to a license plate, and means for fastening the lower ends of the supports and plate to a motor vehicle mounting.

RUSSELL J. DE WEES.